US012793904B2

(12) United States Patent
Berry et al.

(10) Patent No.: US 12,793,904 B2
(45) Date of Patent: Nov. 10, 2026

(54) MOUNTING ASSEMBLY FOR A PRINTED CIRCUIT BOARD WITHIN AN APPLIANCE CONTROL PANEL

(71) Applicant: Haier US Appliance Solutions, Inc., Wilmington, DE (US)

(72) Inventors: Michelle Diana Gross Berry, Louisville, KY (US); Kyle James Brewer, Louisville, KY (US); Aldo Vincent Kremmel, Palmyra, IN (US); Zachary Wiles, Louisville, KY (US); Jeffrey Thomas Kiesler, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 419 days.

(21) Appl. No.: 18/361,057

(22) Filed: Jul. 28, 2023

(65) Prior Publication Data

US 2023/0371190 A1 Nov. 16, 2023

(51) Int. Cl.

| | |
|---|---|
| ***A47L 15/42*** | (2006.01) |
| ***H01G 4/38*** | (2006.01) |
| ***H01G 9/00*** | (2006.01) |
| ***H01G 9/04*** | (2006.01) |
| ***H01G 9/10*** | (2006.01) |
| ***H01G 9/15*** | (2006.01) |

(52) U.S. Cl.

CPC ........ *H01G 9/0029* (2013.01); *A47L 15/4257* (2013.01); *A47L 15/4293* (2013.01); *H01G 4/38* (2013.01); *H01G 9/04* (2013.01); *H01G 9/10* (2013.01); *H01G 9/15* (2013.01)

(58) Field of Classification Search

None

See application file for complete search history.

(56) References Cited

U.S. PATENT DOCUMENTS

| | | | |
|---|---|---|---|
| 8,347,902 | B2 | 1/2013 | Baldwin |
| 9,035,178 | B2 | 5/2015 | Gerstner et al. |
| 9,239,552 | B2 | 1/2016 | Iida et al. |
| 10,480,847 | B2 | 11/2019 | Heisswolf et al. |
| 10,485,399 | B2 | 11/2019 | Min et al. |
| 10,921,053 | B2 | 2/2021 | Staud et al. |
| 2011/0181516 | A1 | 7/2011 | Mallory et al. |
| 2020/0405121 | A1 | 12/2020 | Park et al. |
| 2023/0042049 | A1 | 2/2023 | Kremmel et al. |

FOREIGN PATENT DOCUMENTS

| | | | |
|---|---|---|---|
| CN | 216933112 | U | 7/2023 |
| EP | 2650614 | B1 | 7/2018 |
| WO | WO2020097791 | A1 | 5/2020 |
| WO | WO2022167329 | A1 | 8/2022 |

*Primary Examiner* — Levon J Shahinian

(74) *Attorney, Agent, or Firm* — Dority & Manning, P.A.

(57) ABSTRACT

A control panel for an appliance defines a display direction and includes a console cover defining a display surface and an inner surface, a printed circuit board defining a first surface and a second surface opposite the first surface along the display direction, wherein the first surface of the printed circuit board is positioned against the inner surface of the console cover, a retention bracket mounted over the second surface of the printed circuit board to secure the printed circuit board to the console cover, and a resilient member that extends from the retention bracket toward the printed circuit board and is biased against the second surface of the printed circuit board.

18 Claims, 6 Drawing Sheets

MOUNTING ASSEMBLY FOR A PRINTED CIRCUIT BOARD WITHIN AN APPLIANCE CONTROL PANEL

FIELD OF THE INVENTION

The present subject matter relates generally to control panels for appliances, and more particularly to features for mounting printed circuit boards within appliance control panels.

BACKGROUND OF THE INVENTION

Appliances frequently include doors for closing, insulating, concealing, or otherwise providing selective access to cavities or chambers of the appliance. These doors typically include an inner and outer door that are separated by an air gap which may be filled with fiberglass or insulating foam, e.g., for thermal insulation, sound dampening, etc. In order to provide a user with information regarding the appliance operation, e.g., such as a status of an operating cycle or an indication that a cycle is complete, status indicators are often positioned on the outer door of the appliance such that they are visible to a user of the appliance. In addition, or alternatively, appliances such as dishwasher appliance may include control panels that are integrated into the top of the dishwasher door, e.g., to minimize features on the outer door and provide a clean look.

Conventional appliance control panels may use capacitive touch sensors that are positioned on a printed circuit board behind a control panel. The control panel may have indicators that are positioned over the capacitive touch sensors, such that a user may manipulate operation of the appliance by placing a finger on a display indicator, which corresponds to and triggers a capacitive touch sensor. Notably, conventional control panels may periodically be unresponsive to user inputs because the capacitive touch sensor is positioned too far from the control panel, e.g., due to variations in part tolerances and the failure to maintain firm contact between the capacitive touch sensors and the control panel.

Accordingly, an appliance having an improved control panel assembly would be useful. More specifically, a control panel including capacitive touch sensors with improved responsiveness to user inputs would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment, a control panel for an appliance is provided. The control panel defines a display direction and includes a console cover defining a display surface and an inner surface, a printed circuit board defining a first surface and a second surface opposite the first surface along the display direction, wherein the first surface of the printed circuit board is positioned against the inner surface of the console cover, a retention bracket mounted over the second surface of the printed circuit board to secure the printed circuit board to the console cover, and a resilient member that extends from the retention bracket toward the printed circuit board and is biased against the second surface of the printed circuit board.

In another exemplary embodiment, a dishwasher appliance is provided defining a vertical direction, a lateral direction, and a transverse direction. The dishwasher appliance includes a wash tub positioned within a cabinet and defining a wash chamber, a door pivotally mounted to the cabinet to provide selective access to the wash chamber, and a control panel mounted on the door and defining a display direction. The control panel includes a console cover defining a display surface and an inner surface, a printed circuit board defining a first surface and a second surface opposite the first surface along the display direction, wherein the first surface of the printed circuit board is positioned against the inner surface of the console cover, a retention bracket mounted over the second surface of the printed circuit board to secure the printed circuit board to the console cover, and a resilient member that extends from the retention bracket toward the printed circuit board and is biased against the second surface of the printed circuit board.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
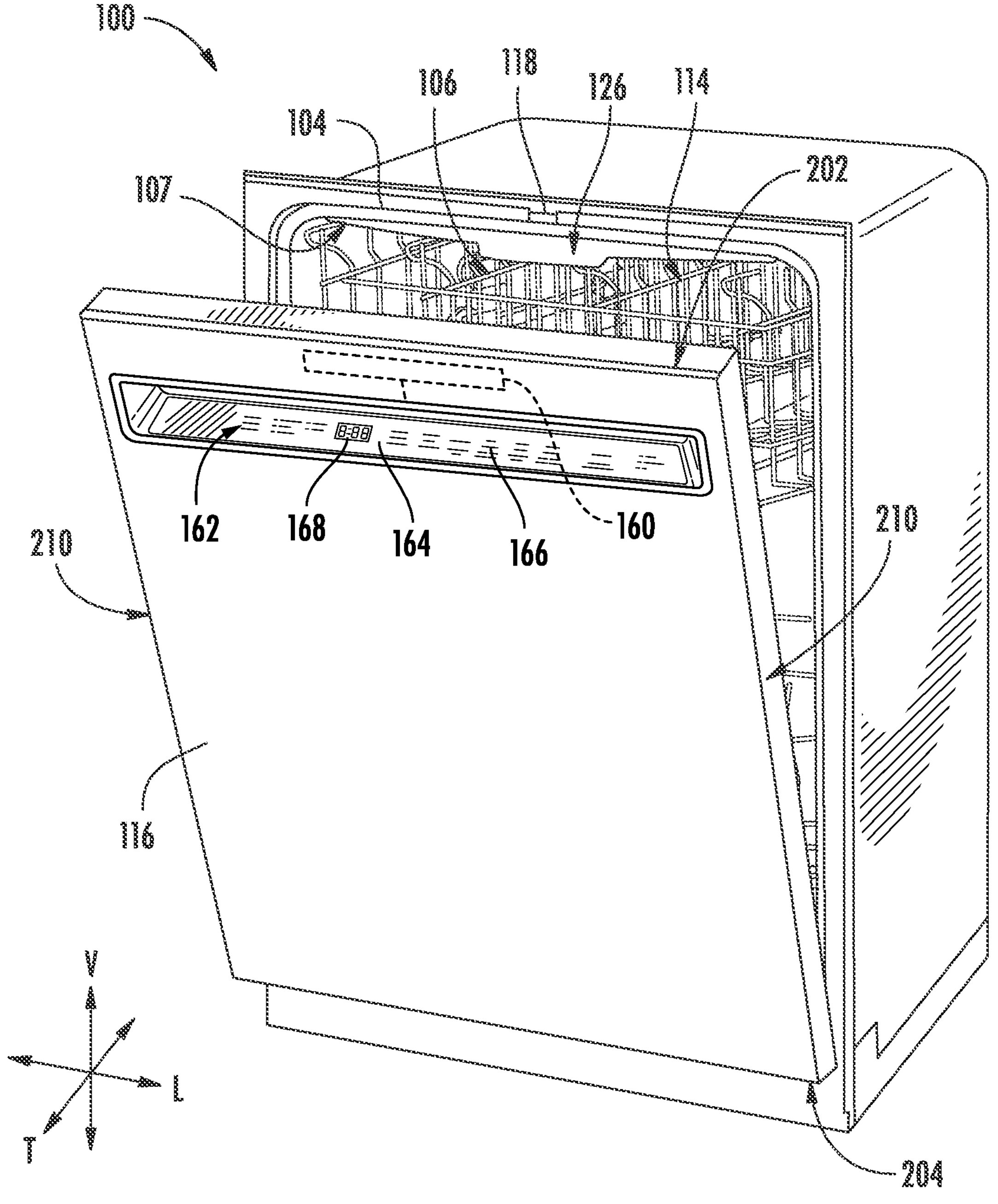
FIG. 1 provides a perspective view of a dishwasher appliance, including a dishwasher door according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
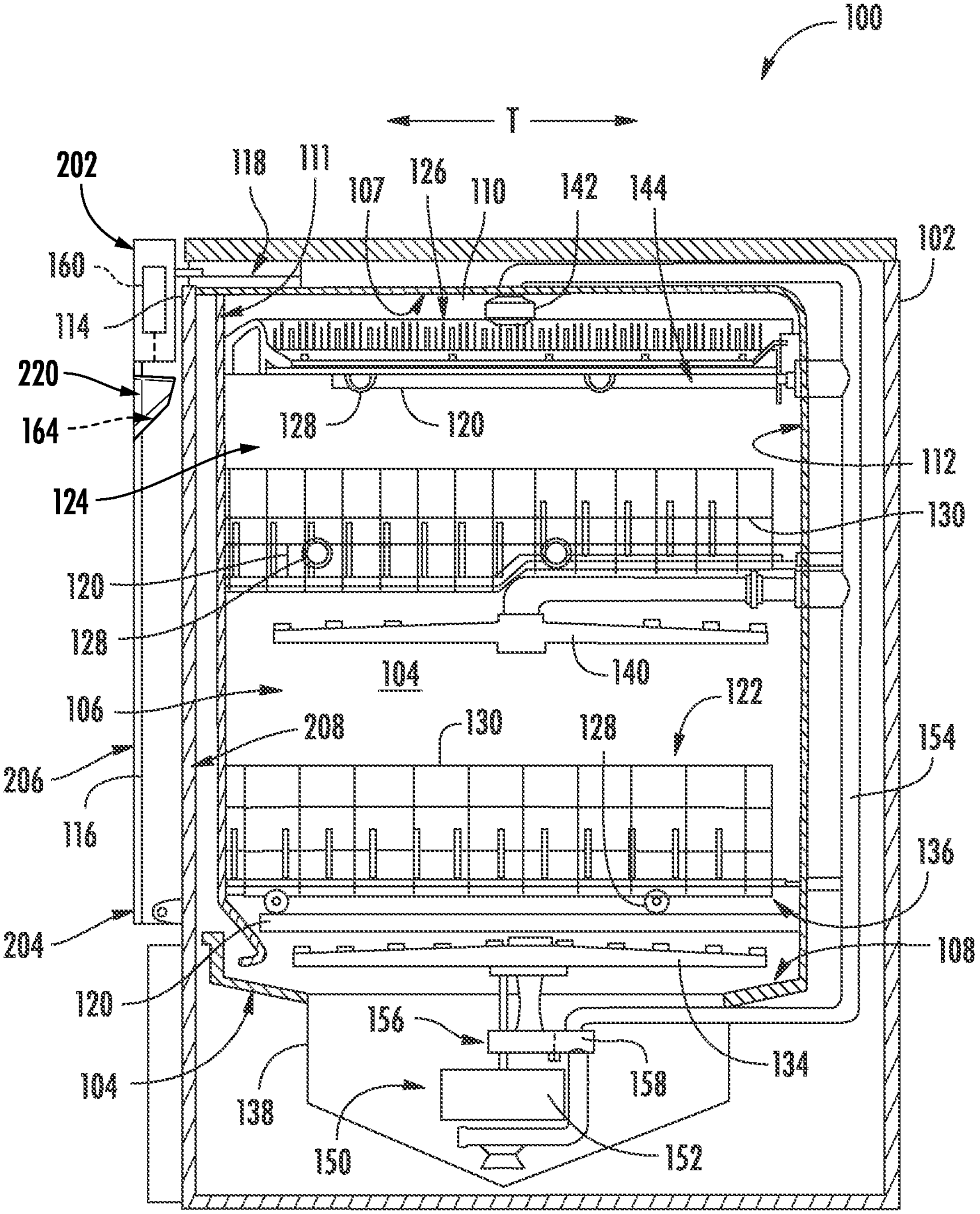
FIG. 2 provides a cross-sectional side view of the exemplary dishwashing appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually orthogonal to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As illustrated in FIG. 2, tub side walls 110 may accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles (e.g., during a cleaning or rinsing cycle). According to another exemplary embodiment, a silverware basket (not shown) may be removably attached to a rack assembly (e.g., lower rack assembly 122) for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water or wash fluid (e.g., detergent, water, or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies (e.g., to mid-level spray arm assembly 140 and upper spray assembly 142). However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only and are not limitations of the present subject matter.

In operation, pump 152 draws wash fluid in from sump 138 and pumps it to a diverter assembly 156 (e.g., which may be positioned within sump 138 of dishwasher appliance 100). Diverter assembly 156 may include a diverter disk (not shown) disposed within a diverter chamber 158 for selectively distributing the wash fluid to the spray arm assemblies 134, 140, 142 or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level or upper spray assemblies 140, 142 (e.g., such as primary supply conduit 154).

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor (e.g., using a combination of discrete analog or digital logic circuitry, such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116, as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel 164 through which a user may select various operational features and modes and monitor progress of the dishwasher 100. In one embodiment, the user interface 164 may represent a general purpose I/O ("GPIO") device or functional block. In certain embodiments, the user interface 164 includes input components 166, such as one or more of a variety of electrical, mechanical or electro-mechanical input devices including rotary dials, push buttons, and touch pads. The user interface 164 may further include one or more display components 168, such as a digital display device or one or more indicator light assemblies designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter. Moreover, aspects of the present subject matter may be applied to other appliances as well, such as refrigerators, ovens, microwaves, etc.

Referring now generally to FIGS. 3 through 9, a door assembly 200 will be described according to exemplary embodiments of the present subject matter. For example, door assembly 200 may be used as door 116 of dishwashing appliance 100. Alternatively, door assembly 200 may be used on any other suitable residential or commercial appliance. As described herein, door assembly 200 may share a coordinate system with dishwashing appliance 100, e.g., when door assembly 200 is in the closed position (e.g., as shown in FIG. 2). Specifically, door assembly 200 may define a vertical direction V, a lateral direction L, and a transverse direction T. Therefore, these directions may be used herein to refer to features of door assembly 200 and its various components and sub-assemblies. Referring briefly again to FIGS. 1 and 2, in the normally closed position, door assembly 200 (illustrated for example as door 116) extends from a top end or top edge 202 to a bottom end or bottom edge 204 along the vertical direction V; from a front end 206 to a rear end 208 along the transverse direction T; and between two lateral ends 210 along the lateral direction L.

Figure 3:
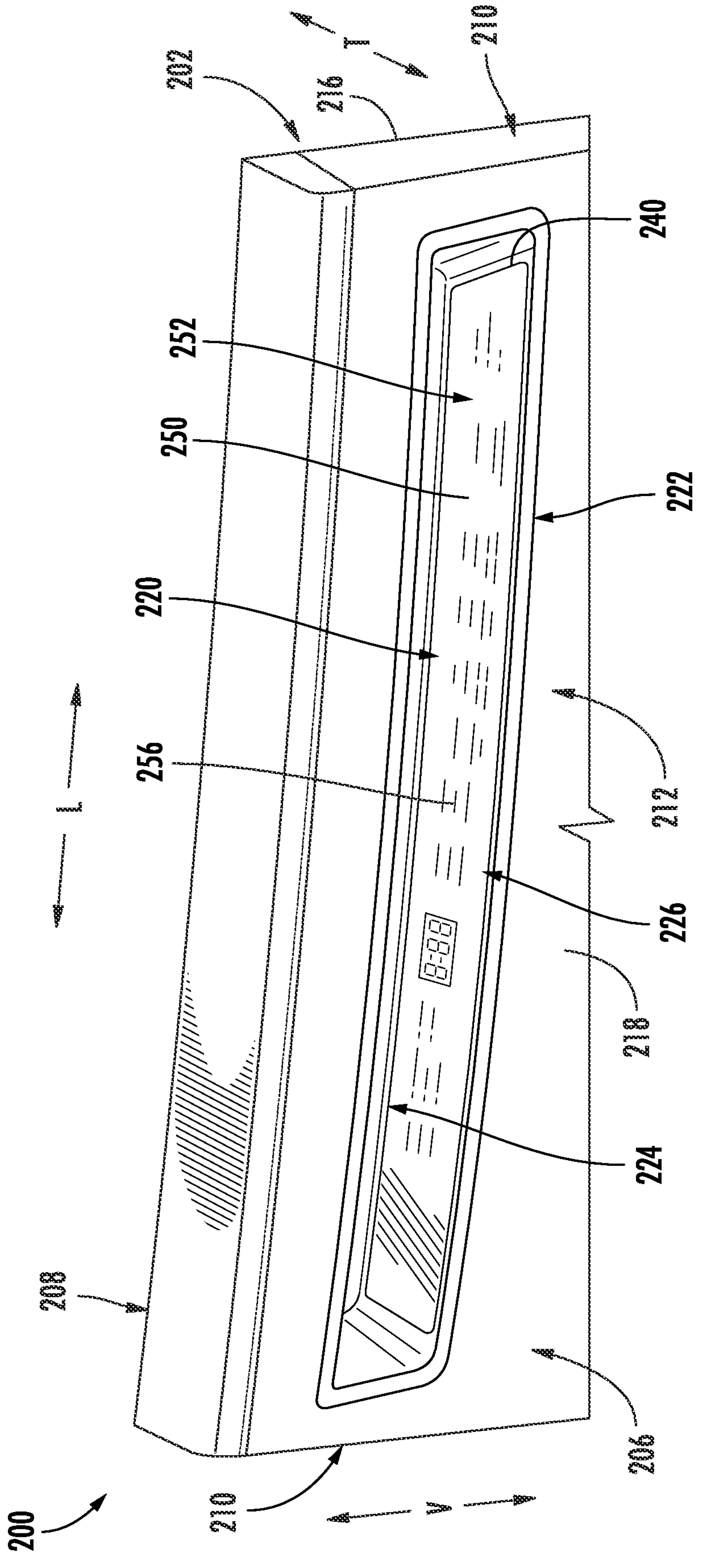
FIG. 3 provides a close-up perspective view of a control panel of the exemplary dishwasher door of FIG. 1 according to exemplary embodiments of the present disclosure.
Figure 4:
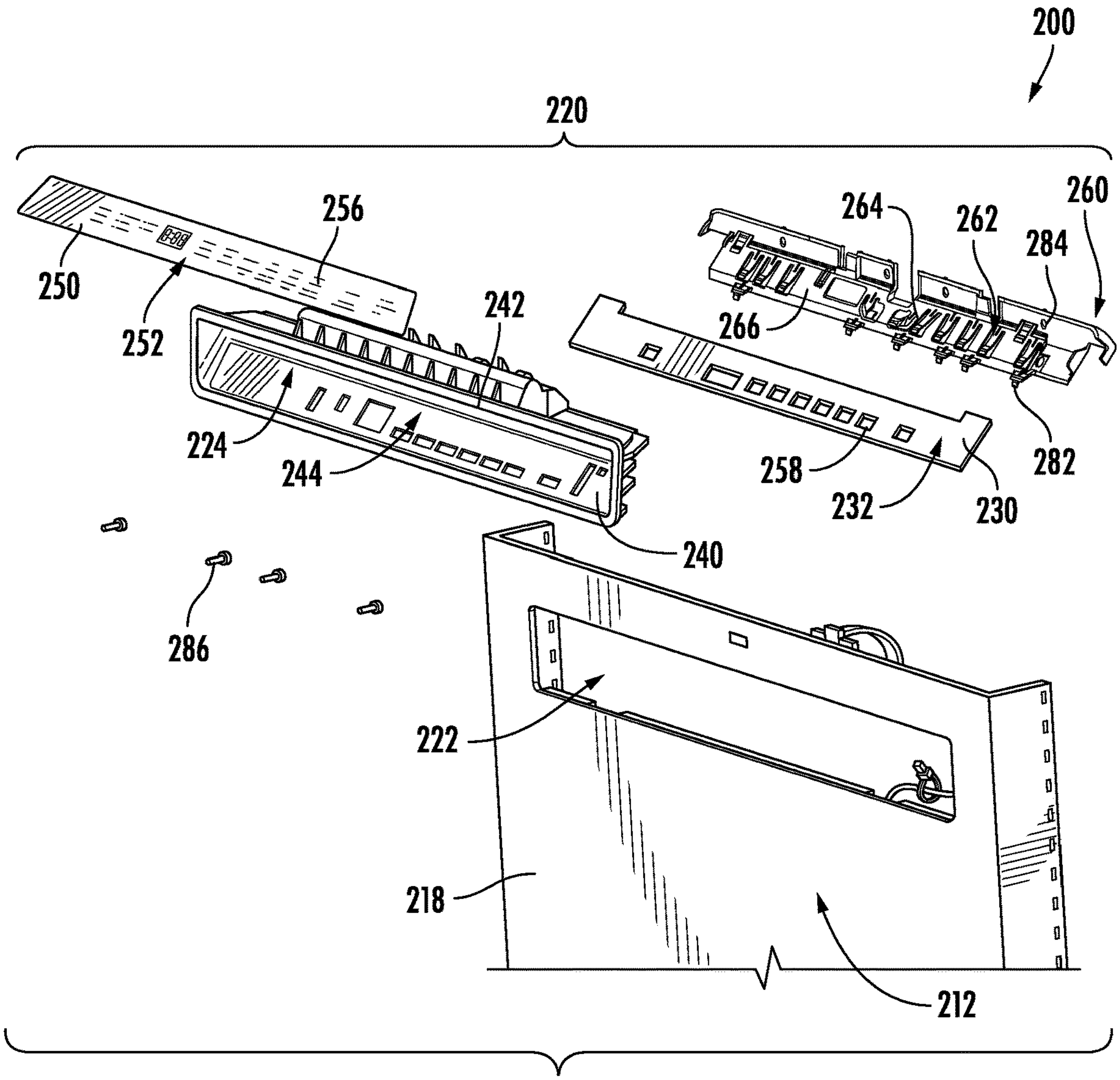
FIG. 4 provides an exploded view of the exemplary dishwasher door of FIG. 1 according to exemplary embodiments of the present disclosure.

As best illustrated in FIGS. 3 and 4, door assembly 200 may include a door frame 212 that is formed from one or more exterior panels. In general, these exterior panels of door frame define an interior chamber 214 of door assembly 200. For example, door assembly 200 generally includes an inner door panel 216 and an outer door panel 218 which are spaced apart from each other along the transverse direction T to define a door gap or interior chamber 214 of door assembly 200 therebetween. For instance, outer door panel 218 may be positioned at or proximal to the front end 206 (i.e., distal to the rear end 208) and inner door panel 216 may be positioned at or proximal to the rear end 208 (i.e., distal to the front end 206).

According to exemplary embodiments, inner door panel 216 and outer door panel 218 may be panels that are stamped from stainless steel. Alternatively, inner door panel 216 and outer door panel 218 may be formed from any other suitably rigid material, such as thermoformed plastic, other metals, etc. In general, inner door panel 216 and outer door panel 218 may be assembled in any suitable manner. In addition, inner door panel 216 and outer door panel 218 may be secured together using any suitable mechanical fastener, welding, snap-fit mechanisms, etc. In addition, it should be appreciated that an insulating material (not shown), such as fiberglass or foam insulation, may be positioned within interior chamber 214 to provide thermal and/or sound insulation to dishwashing appliance 100.

According to the illustrated embodiment, door assembly 200 may further include a pocket handle assembly 220. In this regard, as illustrated, pocket handle assembly 220 is mounted in a door aperture 222 of outer door panel 218 that is defined proximate top edge 202 of door assembly 200. Although the figures illustrate pocket handle assembly 220 mounted within door aperture 222, it should be appreciated that the size, position, and configuration of pocket handle assembly 220 may vary while remaining within the scope of the present subject matter.

As noted above, pocket handle assembly 220 is disposed at door aperture 222 of outer door panel 218. For example, pocket handle assembly 220 may be snap-fit, fastened, etc. to door assembly 200 at one or more mounting features, e.g., at ends of pocket handle assembly 220. Pocket handle assembly 220 may define an opening and an interior pocket

224. The opening of pocket handle assembly 220 may be positioned at outer door panel 218 and interior pocket 224 may extend into pocket handle assembly 220 and interior chamber 214. A user of dishwasher appliance 100 may insert fingers into interior pocket 224 via the opening of outer door panel 218 and may engage a grip surface positioned above the opening at a top of interior pocket 224. The grip surface may include projections, knurls, or other surface formations to increase friction and facilitate a grip of the user on pocket handle assembly 220.

As illustrated, door assembly 200 may generally include a control panel 226 that is mounted on door assembly 200 and is generally configured for facilitating user interaction with the dishwasher 100. In this regard, for example, control panel 226 (e.g., which may correspond to control panel 162 from FIG. 1) may be in direct operative communication with controller 160 of dishwasher 100, such that user inputs via control panel 226 may be directly used to regulate operation of various components of dishwasher 100.

According to the illustrated embodiment, control panel 226 may be integrated into pocket handle assembly 220. For example, control panel 226 may be positioned within and mounted to pocket handle assembly 220, e.g., at an angled surface below the "pocket" of pocket handle assembly 220. In this manner, a user may have convenient view of control panel 226 and may easily enter user inputs while also using pocket handle assembly to open and/or close door assembly 200. Although control panel 226 is illustrated as being integrated into pocket handle assembly 220, it should be appreciated that aspect of the present subject matter may be applicable to other mounting locations of control panels, e.g., such as top mount control panels or control panels mounted flush to a front surface of an appliance door. In addition, it should be appreciated that the present subject matter is not limited only to doors of dishwasher appliance but could instead be applied to any surface of any suitable appliance.

According to exemplary embodiments of the present subject matter, control panel 226 may generally define a display direction (e.g., identified generally by reference numeral 228). In general, display direction 228 may refer to the direction along which a user typically views control panel 226. For example, for a top control dishwasher appliance, the display direction 228 may generally extend normal to top edge 202 of door assembly 200. According to the illustrated embodiment, display direction 228 is angled relative to the horizontal direction, e.g., such as at about 45 degrees relative to the horizontal direction. In this manner, display direction 228 may generally align with the angle of view from a user standing in front of dishwasher appliance 100. According to still other embodiments, the display direction 228 may extend out a front end 206 door assembly 200. It should be appreciated that the directional orientations provided herein are only intended to facilitate discussion of aspects of the present subject matter, e.g., to describe the relative positioning of various components of control panel 226. However, it should be appreciated that these directional orientations may vary depending on the construction of the door assembly while remaining within the scope of the present subject matter.

Referring now specifically to FIGS. 4 through 9, control panel 226 may generally include a user interface board or printed circuit board 230 that may generally be configured for supporting controller 160 and various other control inputs or outputs of dishwasher appliance 100. More specifically, as understood by one of ordinary skill in the art, printed circuit board 230 may include or be operably coupled to one or more user inputs (e.g., user inputs 166) for receiving user input and/or to one or more displays or indicators (e.g., display components 168) for providing user notifications, e.g., by illuminating indicators to indicate cycles or operating status.

According to the illustrated embodiment, printed circuit board 230 is positioned behind pocket handle assembly 220 within interior chamber 214 of door assembly 200. According to the illustrated embodiment, printed circuit board 230 generally defines a first surface or a top surface 232 and a second surface or a bottom surface 234 that is opposite top surface 232 along the display direction 228.

According to the illustrated embodiment, pocket handle assembly 220 further includes a console cover 240 that is positioned over printed circuit board 230. In this regard, pocket handle assembly 220 may include a pocket handle body 242 that generally defines interior pocket 224. According to an example embodiment, console cover 240 may form a portion of handle body 242. In this regard, console cover 240 may be the lower portion of handle body 242 and may have a display surface 244 (e.g., facing toward a front of dishwasher appliance 100) and an inner surface 246 positioned opposite display surface 244 (e.g., within interior chamber 214). It should be appreciated that console cover 240 could instead a top panel of door assembly 200 (e.g., in a top mount control dishwasher), on a front panel of door assembly 200 (e.g., in a front mount control dishwasher), etc.

In this regard, for example, console cover 240 may be any suitable electrically insulated and opaque material that is mounted on top surface 232 of printed circuit board 230, e.g., to serve as a rigid support to facilitate user interaction with control panel 226. According to an example embodiment, printed circuit board 230 is mounted to console cover 240 such that top surface 232 of printed circuit board 230 is positioned against and mounted in direct contact with inner surface 246 of console cover 240. According to alternative embodiments, printed circuit board 230 could also be mounted with adhesive between the top surface 232 of printed circuit board 230 and console cover 240.

According to the illustrated embodiment, door assembly 200 may further include a plurality of light sources (not shown) that are mounted to top surface 232 of printed circuit board 230 for selectively generating light. In this regard, light sources may be configured for illuminating indicators, control inputs, or other features on control panel 226. To achieve illumination through console cover 240, aperture may be defined through console cover 240 to permit light to pass therethrough. These light sources may include any suitable number, type, configuration, and orientation of light sources mounted at any suitable location to illuminate status indicators or buttons in any suitable colors, sizes, patterns, etc.

The light sources may be provided as any suitable number, type, position, and configuration of electrical light source(s), using any suitable light technology and illuminating in any suitable color. For example, according to the illustrated embodiment, light sources may include one or more light emitting diodes (LEDs), which may each illuminate in a single color (e.g., white LEDs), or which may each illuminate in multiple colors (e.g., multi-color or RGB LEDs) depending on the control signal from controller 160.

However, it should be appreciated that according to alternative embodiments, light sources may include any other suitable traditional light bulbs or sources, such as halogen bulbs, fluorescent bulbs, incandescent bulbs, glow bars, a fiber light source, etc. Moreover, light sources may be operably coupled (e.g., electrically coupled) to printed circuit board 230, another suitable control board, and/or controller 160 (FIG. 2). Activation or illumination of light sources may be generally controlled by a printed circuit board 230 or controller 160 (e.g., to indicate a user input, state of the dishwasher appliance, state of the wash cycle, or any other relevant information to a user).

In addition, an overlay panel 250 (see FIG. 4) may be mounted on top of console cover 240. More specifically, overlay panel 250 may include a bottom surface that is seated directly against display surface 244 of console cover 240. In addition, overlay panel 250 may include a top surface 252 that is directly interacted with by a user of dishwasher appliance 100. In general, overlay panel 250 may be any suitable panel for dead fronting control panel 226 to a user of dishwasher appliance 100. As used herein, the term "dead front" and the like is generally intended to refer to portions of a control panel which may be used as indicators, buttons, interactive control surfaces, or other user-interaction features without exposing the user to the operating side of the equipment or live parts and connections, i.e., lights, electrical connections, etc. According to exemplary embodiments, overlay panel 250 may further include a diffusion layer that is printed or applied to the bottom surface of overlay panel 250 to help facilitate distribution of light. According to example embodiments, some or all indicators are visible in the "off" state but are diffused enough that a user cannot see the button through console cover 240.

For example, overlay panel 250 may include a transparent or translucent body and an opaque masking material that is selectively printed on top surface 252 (or bottom surface) of the translucent body to define one or more indicator zones 256 (e.g., corresponding to user inputs 166 or other indicators) and/or other illuminated features on control panel 226. In this regard, an opaque masking material may be deposited on the translucent body, may be applied using an adhesive, or may be applied in any other manner to define any suitable number, size, and configuration of illuminated features. These illuminated features may be shapes or include other forms such as symbols, words, etc. that are visible on control panel 226. More specifically, when the light sources are energized, indicator zones 256 that correspond to the user inputs 166 or other indicators may be illuminated. Thus, the dead fronted top surface 252 may be the surfaces that are contacted for controlling dishwasher appliance 100 or which may be illuminated for purposes of indicating operating status or other conditions to the user of the dishwasher appliance 100.

According to an exemplary embodiment, indicator zones 256 may correspond to user input buttons 166. In this regard, control panel 226 may include a plurality of capacitive sensors 258 which are mounted below selected indicator zones 256 and are operable to detect user inputs on overlay panel 150 of control panel 226. For example, a capacitive sensor 258 may be mounted to printed circuit board 230 and may be configured for triggering when a user touches a top surface 252 of overlay panel 250 proximate the capacitive sensor 258. In particular, capacitive sensors 258 can detect when a finger or another conductive material with a dielectric different than air contacts or approaches control panel 226.

When a user touches top surface 252 of overlay panel 250 adjacent one of capacitive sensors 258, such capacitive sensor 258 triggers and, e.g., signals a controller (e.g., controller 160). In such a manner, operations of dishwasher appliance 100 can be initiated and controlled. Capacitive sensors 258 may be distributed laterally on printed circuit board 230 below overlay panel 250. Capacitive sensors 258 may also be embedded within printed circuit board 230, e.g., such that a top surface of capacitive sensors 258 sits flush with top surface 232 of printed circuit board 230. It will be understood that any other suitable number, type, and position of capacitive sensors 258 may be used while remaining within the scope of the present subject matter. Indeed, any suitable number, type, and configuration of touch buttons or user inputs 166 may be used while remaining within the scope of the present subject matter.

In general, console cover 240 and/or overlay panel 250 may be constructed from any suitably rigid material to facilitate operation of dishwasher appliance 100. For example, it should be appreciated that various features of control panel 226 may be formed by injection molding, e.g., using a suitable plastic material, such as injection molding grade Polybutylene Terephthalate (PBT), Nylon 6, high impact polystyrene (HIPS), acrylonitrile butadiene styrene (ABS), or any other suitable blend of polymers. Alternatively, according to the exemplary embodiment, these components may be compression molded, e.g., using sheet molding compound (SMC) thermoset plastic or other thermoplastics. According to still other embodiments, portions of control panel 226 may be formed from any other suitable rigid material.

Referring now to FIGS. 4 through 9, the assembly of control panel 226 will be described in more detail according to an example embodiment of the present subject matter. In this regard, as explained above, top surface 232 of the printed circuit board 230 may be seated against inner surface 246 of console cover 240. Notably, it may also be desirable to have a firm or close contact engagement or flat interface between console cover 240 and printed circuit board 230, e.g., to facilitate the effective performance of lights, capacitive sensors, and other electronic components may require that printed circuit board 230 be seated directly against console cover 240. In this regard, for example, capacitive sensors 258 may not be able to properly detect the presence of a finger if there are any gaps or undesirable spacing between printed circuit board 230 and console cover 240.

Accordingly, pocket handle assembly 220 may further include a retention bracket 260 that is mounted over printed circuit board 230 to secure printed circuit board 230 to console cover 240. More specifically, according to the illustrated embodiment, retention bracket 260 engages bottom surface 234 of the printed circuit board 230 to ensure firm contact between printed circuit board 230 and console cover 240. Notably, due to variations in part tolerances or the stack up of various layers of pocket door assembly 220, conventional mounting techniques for printed circuit boards may result in undesirable gaps and sensor performance issues. Retention bracket 260 may be generally designed to rectify these issues.

Specifically, according to the illustrated embodiment, one or more resilient members 262 may generally extend from retention brackets 260 toward printed circuit board 230 and may be biased against the bottom surface 234 of printed circuit board 230. According to example embodiments, retention bracket 260 may include a plurality of resilient members 262 that are spaced apart along a width of retention bracket 260. According to still other embodiments, resilient members 262 may be positioned at locations where firm contact between printed circuit board 230 and console cover 240 is generally desirable, e.g., such as at locations where capacitive sensors 258 are located.

In the installed position, resilient members 262 may generally be in a deflected position, thereby providing pressure against bottom surface 234 of printed circuit board 230. In this regard, resilient members 262 may generally be configured for forming an interference fit with printed circuit board 230 when in the installed position. For example, referring briefly to FIG. 8, resilient member 262 is shown in the installed position (e.g., in solid lines) as well as in a relaxed position (e.g., in dotted lines). Although exemplary resilient members 262 and retention brackets 260 are illustrated herein, it should be appreciated that variations may be made while remaining within the scope of the present subject matter. Accordingly, the present disclosure is not limited to the specific geometry and construction described and illustrated herein.

As illustrated, resilient members 262 may generally include a cantilevered arm 264 that extends away from a main body 266 of retention bracket 260 toward printed circuit board 230. More specifically, main body 266 of retention bracket 216 may define a plurality of apertures 268 and resilient members 262 may extend from an edge of each aperture 268 toward printed circuit board 230. In this manner, cantilevered arm 264 is capable of deflecting into aperture 268, e.g., to accommodate various thicknesses of printed circuit board 230. It should be appreciated that other resilient members 262 are possible and within the scope of the present subject matter.

Figure 9:
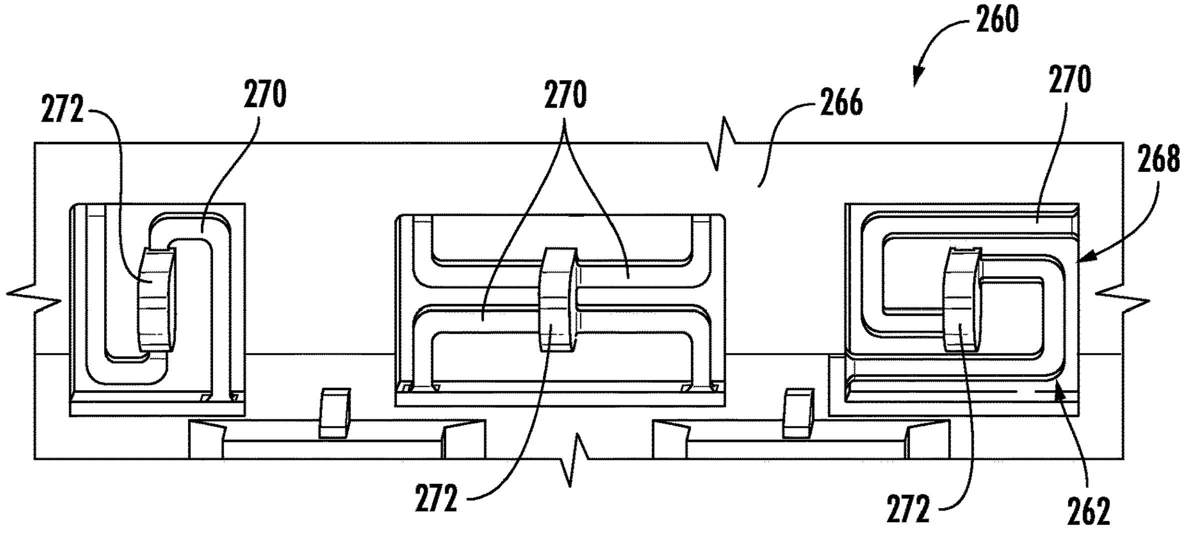
FIG. 9 provides a close-up perspective view of a retention bracket of the exemplary control panel of FIG. 3 according to exemplary embodiments of the present disclosure.

For example, as shown in FIG. 9, according to alternative embodiments, resilient members 262 may include a contact arm 270 that extends over aperture 268, e.g., such that contact arm 270 is attached at two or more edges of aperture 268. In addition, resilient members 262 may include a protruding contact 272 that extends from contact arm 270 toward printed circuit board 230. In this regard, protruding contact 272 may be a simple curve protrusion that extends away from the main body 266 of retention bracket 260 in the relaxed position. As shown, contact arms 270 may include various geometries, such as a single extension between opposite edges, serpentine or zigzag connections, etc. Other constructions are possible and within the scope of the present subject matter.

Figure 5:
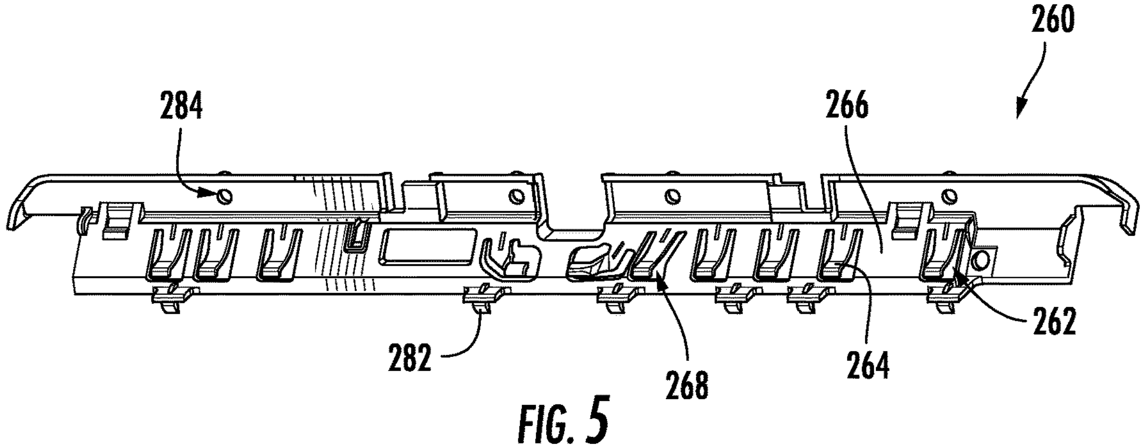
FIG. 5 provides a perspective view of a retention bracket of the exemplary control panel of FIG. 3 according to exemplary embodiments of the present disclosure.
Figure 7:
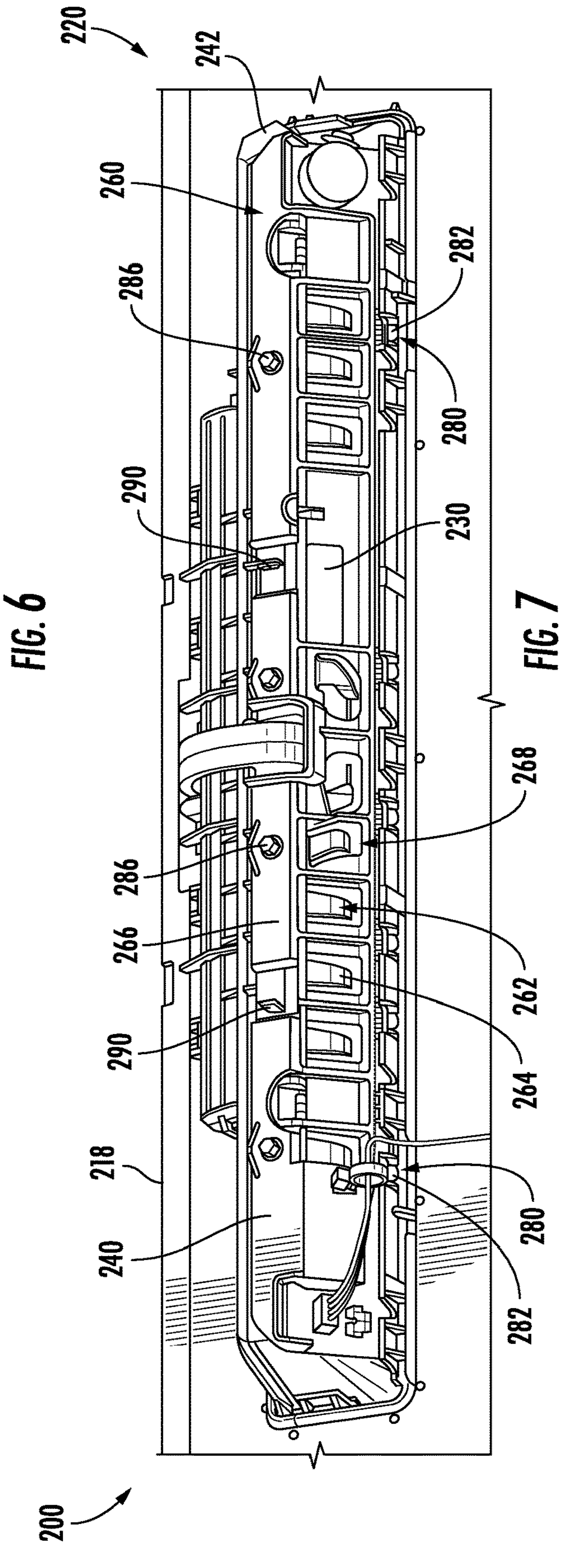
FIG. 7 provides a bottom perspective view of the exemplary control panel of FIG. 3 according to exemplary embodiments of the present disclosure.
Figure 8:
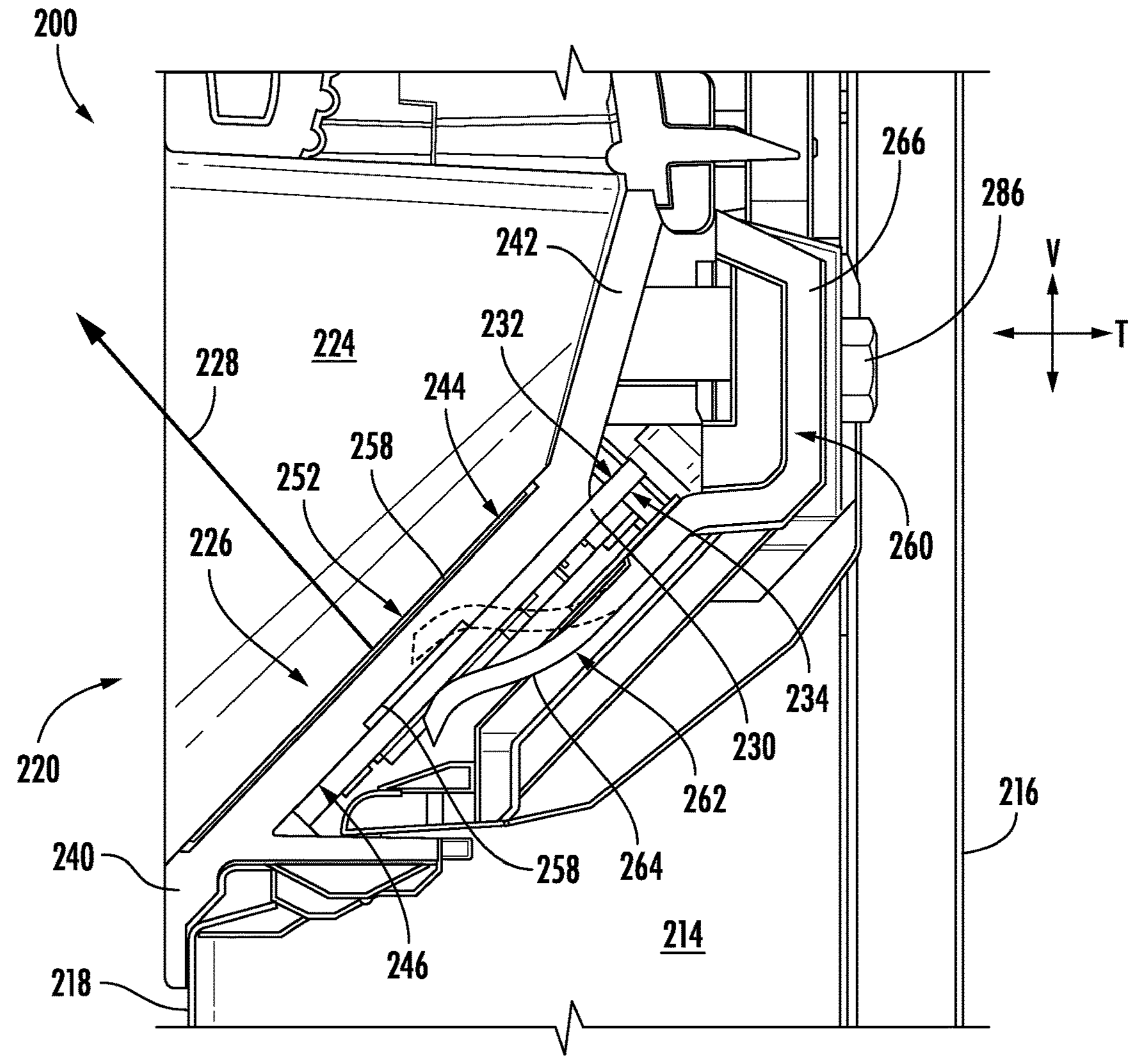
FIG. 8 provides a cross-sectional side view of the exemplary control panel of FIG. 3 according to exemplary embodiments of the present disclosure.

In general, retention bracket 260 may be secured to console cover 240 in any suitable manner. For example, console cover 240 may define a plurality of screw bosses for receiving mechanical fasteners that attach retention bracket 260. According to the illustrated example embodiment, console cover 240 may define a plurality of retention apertures 280 and retention bracket 260 defines a plurality of hooks 282 that are configured for receipt within retention apertures 280 to support retention bracket 260 as it is being installed onto console cover 240. In this regard, as best illustrated in FIGS. 5 and 7, hooks 282 may be defined at a bottom end of retention bracket 260 and may be positioned in retention apertures 280 for pivoting retention bracket 260 upward and into engagement with printed circuit board 230.

According to the illustrated embodiment, retention bracket 260 may further define a plurality of bracket apertures 284 through which mechanical fasteners 286 may be passed and secured into bosses in console cover 240. Once mechanical fasteners 286 are installed, retention bracket 260 may be securely fixed at the both bottom end (e.g., by hooks 282) and at the top end (e.g., by fasteners 286). Although four fasteners 286 are illustrated as securing retention bracket 260 along the width of retention bracket 260, it should be appreciated that other fastening mechanisms may be used while remaining within the scope of the present subject matter.

Figure 6:
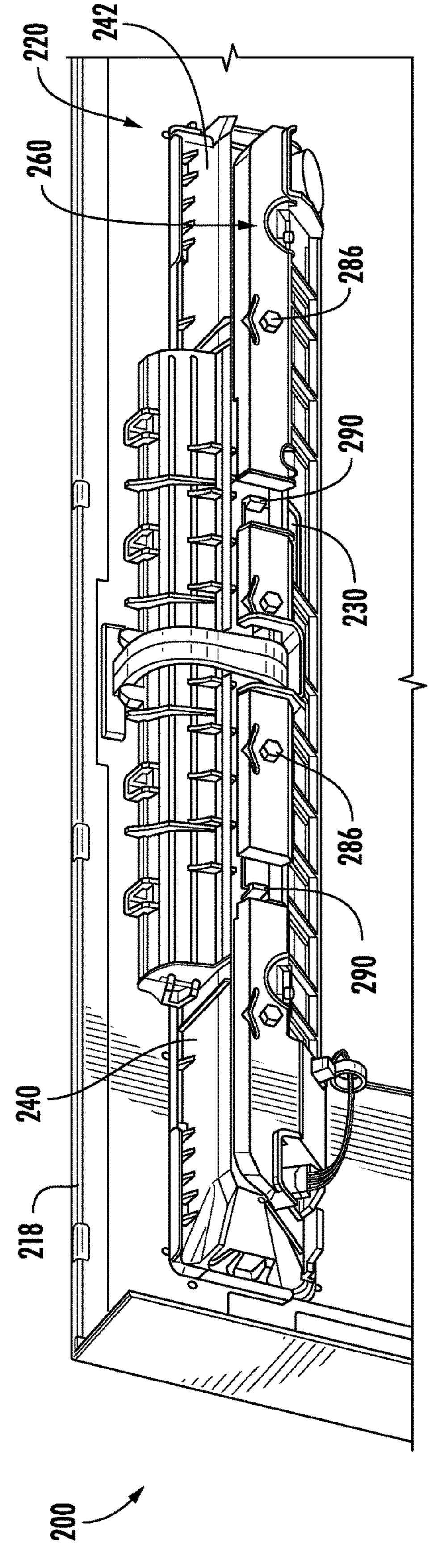
FIG. 6 provides a top perspective view of the exemplary control panel of FIG. 3 according to exemplary embodiments of the present disclosure.

For example, as shown in FIG. 6, console cover 240 may further define one or more flexible clips or retention features 290 that are generally configured for engaging in an edge of retention bracket 260. In this regard, these retention features may be used to temporarily hold retention bracket in place while permanently securing it (e.g., using mechanical fasteners 286) or may be the final step of assembly and installation of retention bracket 260. In general, retention features 290 may have any suitable geometry and attachment mechanism for engaging printed retention bracket 260. For example, retention features 290 may include one or more of a clip, a snap, a hook, a flexible detent, a biased latch, or any other suitable mechanism. Example retention features 290 are shown in FIG. 6, though one of ordinary skill in the art would understand that these are non-limiting examples, and any other suitable retention feature may be used.

In general, retention features 290 may include flexible clips that are positioned around an edge of retention bracket 260. According to still other embodiments, retention bracket 260 may define one or more retention aperture (not shown) that extend through retention bracket 260. According to example embodiments, one or more retention features 290 may pass through the retention apertures to engage the back surface of retention bracket 260. Other suitable retention features 290 and methods for engaging retention bracket 260 are possible and within the scope of the present subject matter.

As explained above, aspects of the present subject matter are generally directed to a dishwasher console bracket with flexible features that are intended to have interference with a PCB board to hold that PCB board in a desired position. The bracket hooks along the bottom of the console/pocket handle, rotates into place, and is secured to the console by four screws. Flexible fingers and/or levers are designed with interference to the board to ensure there is always contact with and force on the board and holding the board flush to the rear surface of the console.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control panel for an appliance, the control panel defining a display direction and comprising:

a console cover defining a display surface and an inner surface;

a printed circuit board defining a first surface and a second surface opposite the first surface along the display direction, wherein the first surface of the printed circuit board is positioned against the inner surface of the console cover;

a retention bracket mounted over the second surface of the printed circuit board to secure the printed circuit board to the console cover; and a resilient member that extends from the retention bracket toward the printed circuit board and is biased against the second surface of the printed circuit board, wherein the resilient member is integrally formed with the retention bracket and is a cantilevered arm that extends toward the printed circuit board.

2. The control panel of claim 1, wherein the resilient member comprises:

a contact arm that extends over an aperture defined in the retention bracket; and a protruding contact extending from the contact arm toward the printed circuit board.

3. The control panel of claim 1, wherein the console cover defines a plurality of retention apertures and the retention bracket defines a plurality of hooks that are received within the plurality of retention apertures to secure the retention bracket to the console cover.

4. The control panel of claim 3, wherein the plurality of hooks are positioned at a bottom end of the retention bracket and a plurality of bracket apertures are defined proximate a top of the retention bracket for receiving mechanical fasteners.

5. The control panel of claim 4, wherein the mechanical fasteners are secured in bosses defined on the inner surface of the console cover.

6. The control panel of claim 1, wherein the console cover defines one or more flexible clips configured for engaging an edge of the retention bracket.

7. The control panel of claim 1, wherein the resilient member is one of a plurality of resilient members defined by the retention bracket.

8. The control panel of claim 7, wherein the plurality of resilient members are spaced apart along a width of the retention bracket.

9. The control panel of claim 1, wherein the resilient member forms an interference fit with the printed circuit board when installed.

10. The control panel of claim 1, wherein the console cover defines a plurality of user input zones and the control panel further comprises:

a plurality of capacitive sensors mounted to the printed circuit board to detect user inputs via contact with the console cover in the plurality of user input zones.

11. The control panel of claim 1, wherein the control panel is mounted on a front panel or a top edge of a door of a dishwasher appliance.

12. A dishwasher appliance defining a vertical direction, a lateral direction, and a transverse direction, the dishwasher appliance comprising:

a wash tub positioned within a cabinet and defining a wash chamber;

a door pivotally mounted to the cabinet to provide selective access to the wash chamber; and a control panel mounted on the door and defining a display direction, the control panel comprising:

a console cover defining a display surface and an inner surface;

a printed circuit board defining a first surface and a second surface opposite the first surface along the display direction, wherein the first surface of the printed circuit board is positioned against the inner surface of the console cover;

a retention bracket mounted over the second surface of the printed circuit board to secure the printed circuit board to the console cover; and a resilient member that extends from the retention bracket toward the printed circuit board and is biased against the second surface of the printed circuit board, wherein the resilient member is integrally formed with the retention bracket and is a cantilevered arm that extends toward the printed circuit board.

13. The dishwasher appliance of claim 12, wherein the resilient member comprises:

a contact arm that extends over an aperture defined in the retention bracket; and a protruding contact extending from the contact arm toward the printed circuit board.

14. The dishwasher appliance of claim 12, wherein the console cover defines a plurality of retention apertures and the retention bracket defines a plurality of hooks that are received within the plurality of retention apertures to secure the retention bracket to the console cover.

15. The dishwasher appliance of claim 12, wherein the console cover defines one or more flexible clips configured for engaging an edge of the retention bracket.

16. The dishwasher appliance of claim 12, wherein the resilient member is one of a plurality of resilient members defined by the retention bracket, and wherein the plurality of resilient members are spaced apart along a width of the retention bracket.

17. The dishwasher appliance of claim 12, wherein the resilient member forms an interference fit with the printed circuit board when installed.

18. The dishwasher appliance of claim 12, wherein the console cover defines a plurality of user input zones and the control panel further comprises:

a plurality of capacitive sensors mounted to the printed circuit board to detect user inputs via contact with the console cover in the plurality of user input zones.

* * * * *